(12) United States Patent
Austin et al.

(10) Patent No.: US 11,842,258 B2
(45) Date of Patent: *Dec. 12, 2023

(54) SYSTEM, METHOD, AND PLATFORM FOR AUTO MACHINE LEARNING VIA OPTIMAL HYBRID AI FORMULATION FROM CROWD

(71) Applicant: AT&T Intellectual Property I, L.P., Atlanta, GA (US)

(72) Inventors: Mark Austin, Allen, TX (US); Lauren Savage, Santa Clara, CA (US); Joshua Whitney, Richardson, TX (US); Abhay Dabholkar, Allen, TX (US); Vijayan Nagarajan, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,823

(22) Filed: Nov. 29, 2022

(65) Prior Publication Data

US 2023/0104531 A1    Apr. 6, 2023

Related U.S. Application Data

(63) Continuation of application No. 16/703,430, filed on Dec. 4, 2019, now Pat. No. 11,556,737.

(51) Int. Cl.
*G06N 20/20* (2019.01)
*G06F 18/2113* (2023.01)
(Continued)

(52) U.S. Cl.
CPC ........... *G06N 20/20* (2019.01); *G06F 18/217* (2023.01); *G06F 18/2113* (2023.01);
(Continued)

(58) Field of Classification Search
CPC .. G06F 18/2113; G06F 18/217; G06F 18/251; G06K 9/623; G06K 9/6262;
(Continued)

(56) References Cited

U.S. PATENT DOCUMENTS 7,680,746 B2    3/2010  Agarwal
9,471,884 B2    10/2016 Hamann et al.
(Continued)

FOREIGN PATENT DOCUMENTS

WO    2019100032 A2    5/2019

OTHER PUBLICATIONS

Shon, et al., "A hybrid machine learning approach to network anomaly detection", www.sciencedirect.com, pp. 3799-3821. Year: 2007, Mar. 12, 2007, 23 pgs.
(Continued)

*Primary Examiner* — Manav Seth
(74) *Attorney, Agent, or Firm* — GUNTIN & GUST, PLC; John G. Rauch

(57) ABSTRACT

Aspects of the subject disclosure may include, for example, receiving a plurality of proposed machine learning solutions to a machine learning problem including receiving, for each respective proposed machine learning solution of the plurality of proposed machine learning solutions, one or more of a machine learning model, a dataset and a data pipeline output; automatically determining hybrid solutions to the machine learning problem, including combining, by the processing system, at least one of a first component from a first proposed machine learning solution with at least one of a second component from a second proposed machine learning solution; and ranking the hybrid solutions including determining a log loss score for each hybrid solution and sorting the hybrid solutions according to the log loss score for each hybrid solution. Other embodiments are disclosed.

20 Claims, 9 Drawing Sheets

(51) Int. Cl.
*G06F 18/21* (2023.01)
*G06F 18/25* (2023.01)
*G06V 10/80* (2022.01)
*G06V 10/96* (2022.01)

(52) U.S. Cl.
CPC ............ *G06F 18/251* (2023.01); *G06V 10/80* (2022.01); *G06V 10/96* (2022.01)

(58) Field of Classification Search
CPC ...... G06K 9/6289; G06N 20/20; G06V 10/96; G06V 10/80
See application file for complete search history.

(56) References Cited

U.S. PATENT DOCUMENTS

| | | | |
|---|---|---|---|
| 10,121,108 | B2 | 11/2018 | Miserendino et al. |
| 10,536,344 | B2 * | 1/2020 | Mermoud ............... H04L 41/16 |
| 11,556,737 | B2 * | 1/2023 | Austin .................... G06V 10/80 |
| 2004/0176887 | A1 | 9/2004 | Kent et al. |
| 2009/0198671 | A1 | 8/2009 | Zhang et al. |
| 2011/0093414 | A1 | 4/2011 | Xu et al. |
| 2012/0179751 | A1 | 7/2012 | Ahn et al. |
| 2013/0138641 | A1 | 5/2013 | Korolev et al. |
| 2014/0324352 | A1 | 10/2014 | Hamann et al. |
| 2018/0025726 | A1 | 1/2018 | Gatti De Bayser et al. |
| 2018/0046149 | A1 | 2/2018 | Ahmed |
| 2018/0349469 | A1 | 12/2018 | Toudji et al. |
| 2019/0205770 | A1 | 7/2019 | Sathiaraj |
| 2019/0347107 | A1 | 11/2019 | Ma et al. |
| 2019/0372859 | A1 | 12/2019 | Mermoud et al. |
| 2019/0392308 | A1 | 12/2019 | Bhatnagar |
| 2020/0257943 | A1 | 8/2020 | Huber et al. |
| 2020/0342359 | A1 | 10/2020 | Hu et al. |
| 2021/0110298 | A1 * | 4/2021 | Bisson-Krol ........... G06F 18/41 |
| 2021/0174130 | A1 | 6/2021 | Austin et al. |

OTHER PUBLICATIONS

Yang, et al., "A hybrid machine learning method for fusing fMRI and genetic data: combining both improves classification of schizophrenia", www.frontiersin.org, Frontiers in Human Neuroscience, Oct. 25, 2010, 9 pgs.

* cited by examiner

Example ML Problem: Forecast the number of widgets needed 12 months out
Example Data set (D): Historical widget actuals per month from last 3 years

| Rank | Machine Learning Solution | Contributor | Error Score (lower is better) |
|---|---|---|---|
| 1 | Random Forest 1 | Name 1 | 0.45 |
| 2 | Regression A | Name 2 | 0.560044888 |
| 3 | Neural Net A | Name 3 | 0.823475863 |
| 4 | Algorithm X | Team X | 1.218330566 |
| ... | | | |
| N | Attempt Z | Team Y | 1.517563363 |

232

Example ML Problem: Forecast the number of widgets needed 12 months out
Example Data set (D): Historical widget actuals per month from last 3 years

| Rank | Machine Learning Solution | Iter. Data | Data Pipeline Output | ML Model | Contributor | Error Score (lower is better) |
|---|---|---|---|---|---|---|
| 1 | Hybrid 1 | D1,D3 | DP1,DP2,DP3 | Ensemble(model2,model4) | AI Hybrid.bot | 0.1 |
| 2 | Hybrid 2 | D2 | DP1,DP6 | model 2 | AI Hybrid.bot | 0.187337746 |
| 3 | Hybrid 3 | D1 | DP3 | model 1 | AI Hybrid.bot | 0.260993353 |
| 4 | Hybrid 4 | null | DP4 | model 1 | AI Hybrid.bot | 0.433011067 |
| 5 | Random Forest 1 | D1 | DP1 | model 1 | Name 1 | 0.45 |
| 6 | Regression A | null | DP2 | model 2 | Name 2 | 0.560044888 |
| 7 | Neural Net A | D2 | DP3 | model 3 | Name 3 | 0.823475863 |
| 8 | Algorithm X | null | DP4 | model 4 | Team X | 1.218330566 |
| ... | | | | | | |
| N | Attempt Z | null | DPN | model N | Team Y | 1.517563363 |

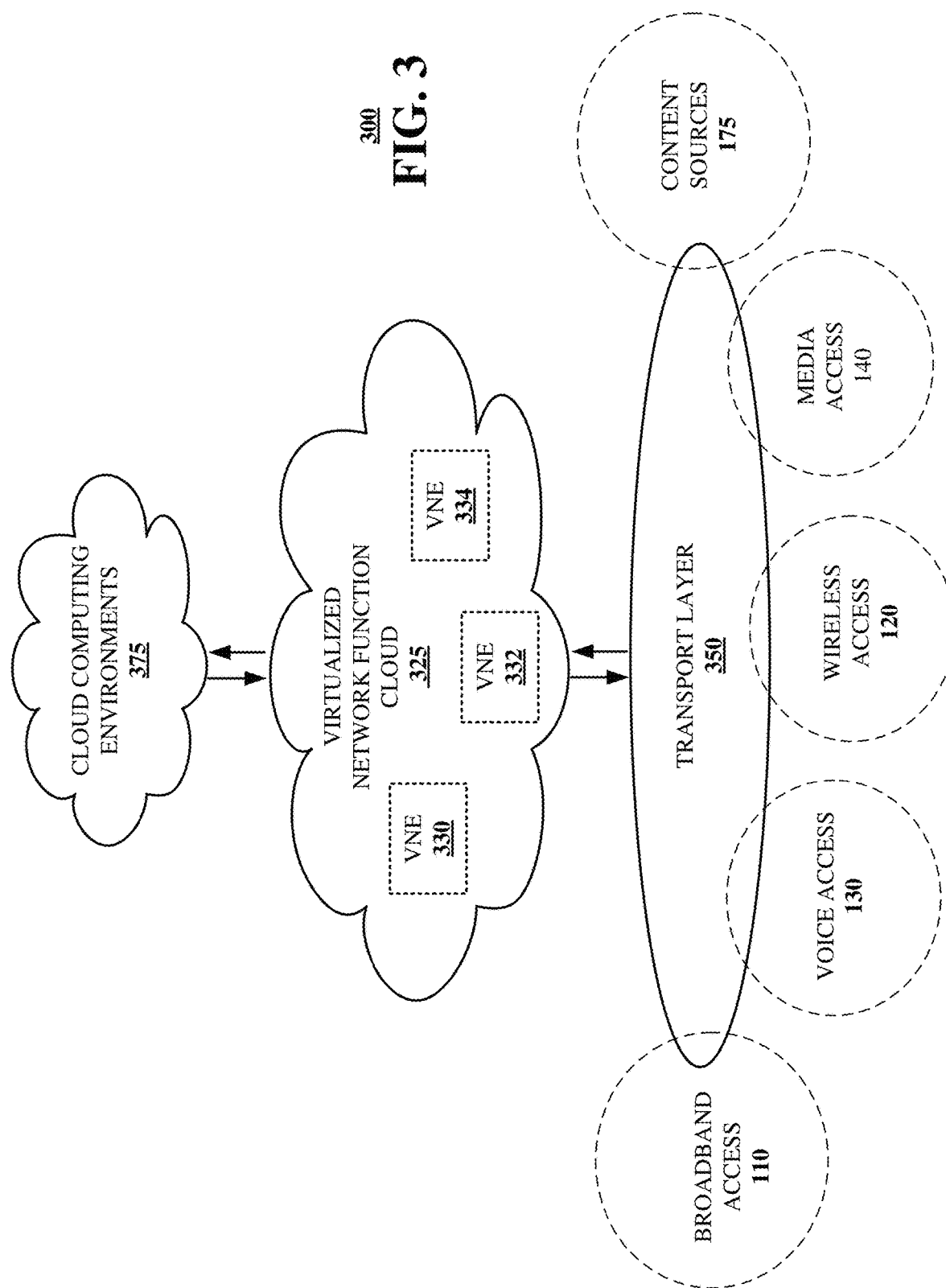

SYSTEM, METHOD, AND PLATFORM FOR AUTO MACHINE LEARNING VIA OPTIMAL HYBRID AI FORMULATION FROM CROWD

CROSS-REFERENCE TO RELATED APPLICATION(S)

The present application claims priority to and is a continuation of U.S. patent application Ser. No. 16/703,430, filed Dec. 4, 2019. All sections of the aforementioned application are incorporated herein by reference in their entirety.

FIELD OF THE DISCLOSURE

The subject disclosure relates to a system, method, and platform for auto machine learning via optimal hybrid Artificial Intelligence formulation from crowd inputs.

BACKGROUND

Artificial Intelligence (AI) systems process received data to provide insight into solutions of one or more problems. A key goal for AI systems is improving the solutions to provide more accurate results and to do so faster and with fewer required resources.

BRIEF DESCRIPTION OF THE DRAWINGS

Reference will now be made to the accompanying drawings, which are not necessarily drawn to scale, and wherein:

FIG. 2B depicts an illustrative embodiment of a leaderboard showing ranking of machine learning solutions to a machine learning problem in accordance with various aspects described herein.

FIG. 3 is a block diagram illustrating an example, non-limiting embodiment of a virtualized communication network in accordance with various aspects described herein.

DETAILED DESCRIPTION

Figure 1:
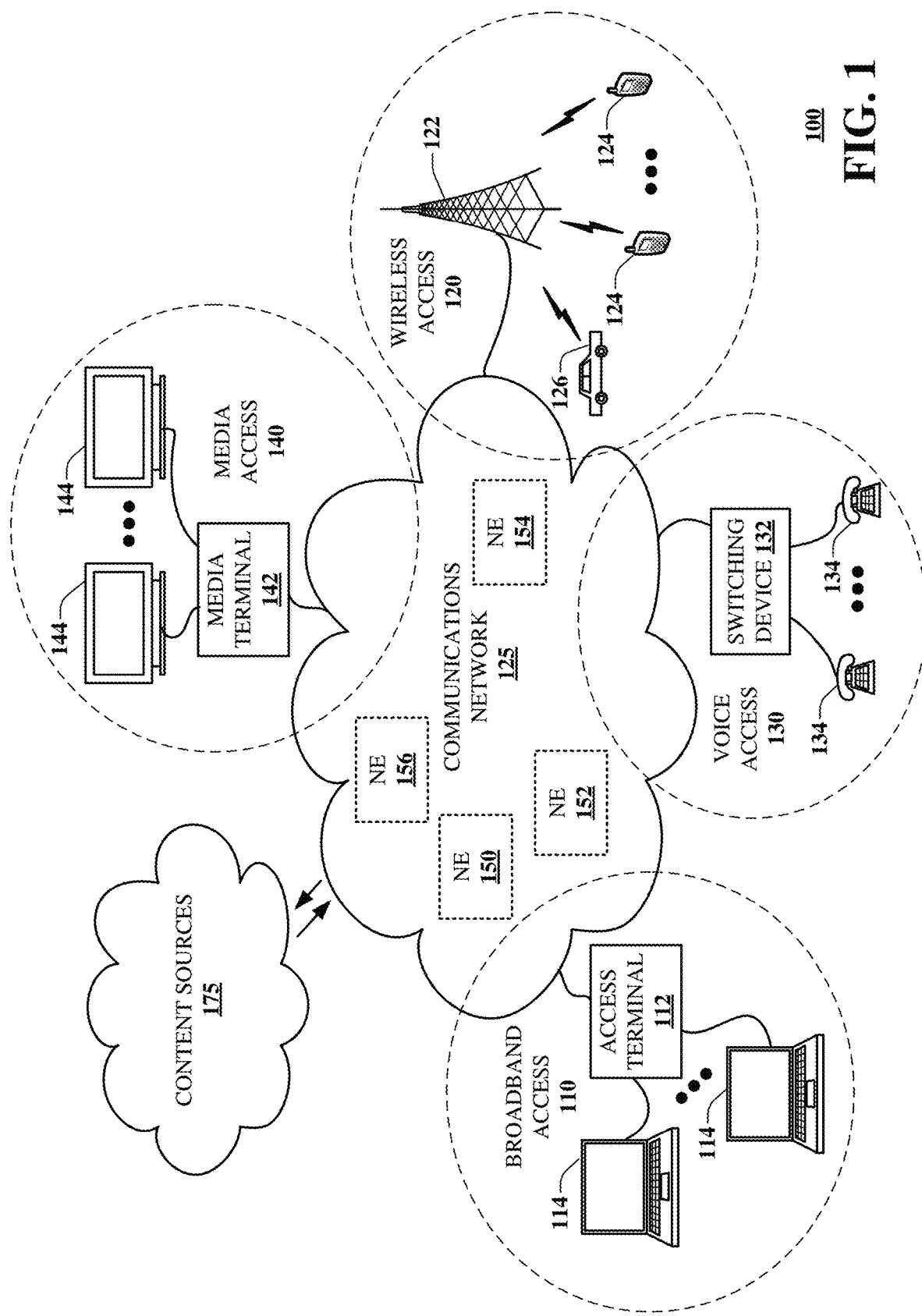
FIG. 1 is a block diagram illustrating an exemplary, non-limiting embodiment of a communications network in accordance with various aspects described herein.

The subject disclosure describes, among other things, illustrative embodiments for a system and method for developing hybrid machine learning solutions based on components of submitted machine learning solutions (e.g. the original data set used, any supplemental joined data used, additional "features" (i.e. derived transformations of the original or supplemental data) created, the final resulting data set used, the machine learning algorithm used (Random Forest, XG boost, etc.), any parameters of said algorithm and "grid search code used", any cross validation strategy and code, etc. but not to be limited to these "components"), scoring and ranking solutions for selection as a preferred solution to a machine learning problem. Other embodiments are described in the subject disclosure.

One or more aspects of the subject disclosure include receiving information defining a machine learning problem to be solved and receiving information about a plurality of machine learning solutions to the machine learning problem, each respective machine learning solution of the plurality of machine learning solutions comprising two (e.g. the data pipeline—the final data set used as input to the machine learning algorithm, and the machine learning algorithm with associated parameters) or more components. The subject disclosure further includes scoring each respective machine learning solution to determine respective scores and ranking the respective machine learning solutions (as on a "leaderboard") and the initial machine learning solution using the respective scores. The subject disclosure further includes developing one or more hybrid machine learning solutions including at least one component of any of the submitted machine learning solutions and at least one component of the plurality of machine learning solutions, scoring the hybrid machine learning solutions and ranking the one or more hybrid machine learning solutions with the respective machine learning solutions to produce a leaderboard ranking. The subject disclosure further includes providing a human readable indication of the leaderboard ranking and receiving a human input indicating a selected machine learning solution among the one or more hybrid machine learning solutions, the respective machine learning solutions, and an initial machine learning solution.

One or more aspects of the subject disclosure include providing information about a machine learning problem to be solved on a web accessible interface and receiving from a plurality of users, including "AI robots" that may submit solutions themselves, with information about proposed solutions to the machine learning problem on the web accessible interface. The subject disclosure further includes ranking the proposed solutions including sorting the proposed solutions via a "pre-determined model goodness evaluation metric" (e.g. the lowest to highest root mean square error, the lowest to highest logarithmic loss, etc.) for each proposed solution. The subject disclosure further includes forming a plurality of hybrid solutions including selecting first components of one of the proposed solutions and second components of a second proposed solution and combining the first components with the second components to form a hybrid solution. The subject disclosure further includes ranking the plurality of hybrid solutions with the proposed solutions including sorting the plurality of hybrid solutions with the proposed solutions according to a "pre-determined model goodness evaluation metric" for each hybrid solution and for each proposed solution. The subject disclosure further includes providing information about the ranking of the plurality of hybrid solutions against the proposed crowd and AI robot submitted solutions receiving a user selection of a selected machine learning solution of the plurality of hybrid solutions and the proposed solutions, wherein the user selection corresponds to a selected machine learning solution that satisfies requirements of the user as selected by the user.

One or more aspects of the subject disclosure include receiving a plurality of proposed machine learning solutions to a machine learning problem including receiving, for each respective proposed machine learning solution of the plurality of proposed machine learning solutions, one or more of a machine learning model, a dataset and a data pipeline output; automatically determining hybrid solutions to the machine learning problem, including combining, by the processing system, at least one of a first component from a first proposed machine learning solution with at least one of a second component from a second proposed machine learning solution; and ranking the hybrid solutions including determining a "pre-determined model goodness evaluation metric" for each hybrid solution and sorting the hybrid solutions according to a "pre-determined model goodness evaluation metric" for each hybrid solution. In concept, the "crowd optimized platform" evaluates all possible combinations of components across all individual solution submissions by the crowd or the AI robots, computes the goodness evaluation metric for each of these formed hybrid solutions, and stack ranks the hybrid solutions on a leaderboard (best to worst). Since each of the individual solutions has different components, at least one of the formed hybrid solutions likely has better performance than any submitted individual solution.

Referring now to FIG. 1, a block diagram is shown illustrating an example, non-limiting embodiment of a communications network 100 in accordance with various aspects described herein. For example, communications network 100 can facilitate in whole or in part a system and method for developing hybrid machine learning solutions based on components of submitted machine learning solutions, scoring and ranking solutions for selection as a preferred solution to a machine learning problem. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
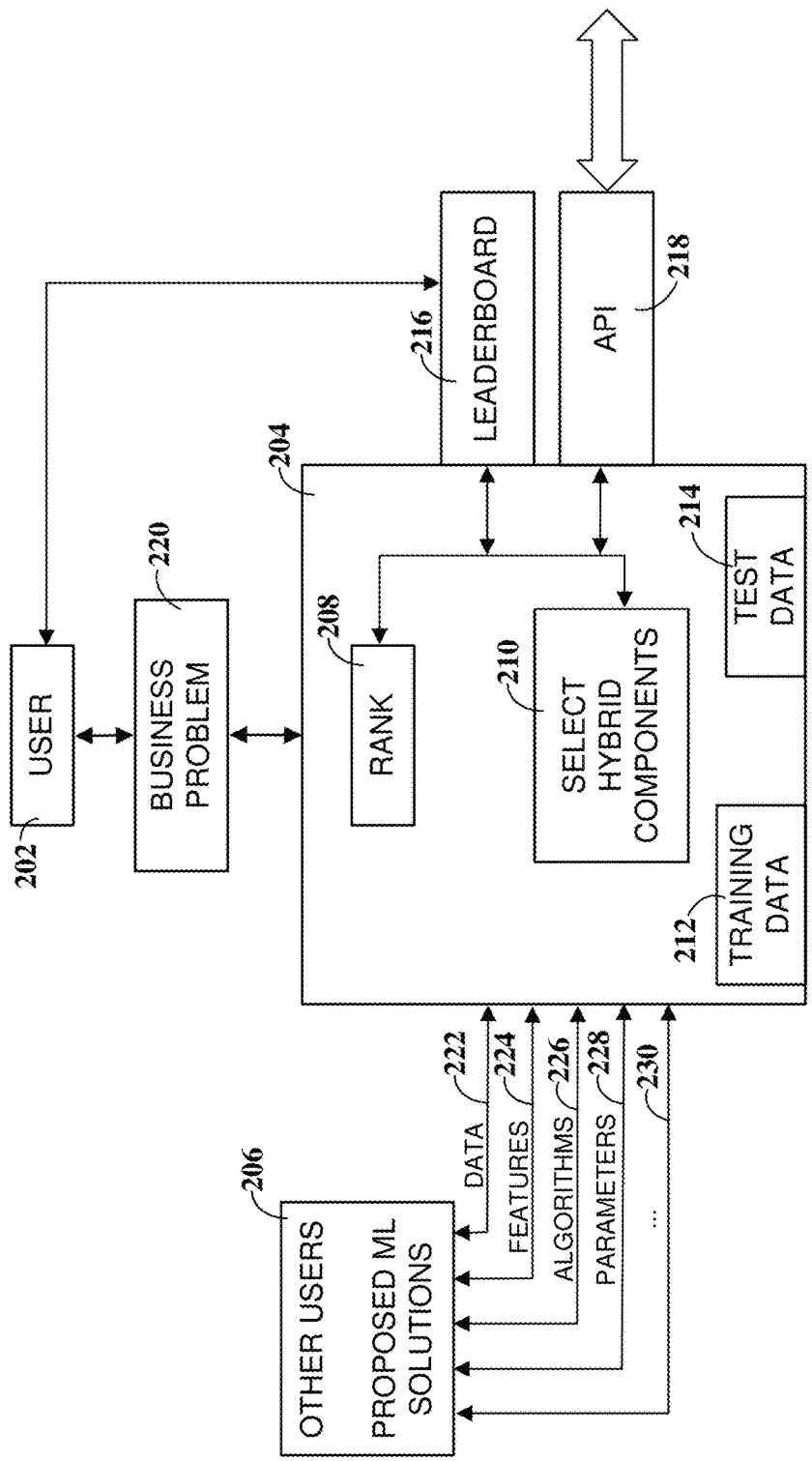
FIG. 2A is a block diagram illustrating an example, non-limiting embodiment of a system for auto machine learning using optimal hybrid artificial intelligence formulation using crowd solutions which may function within the communication network of FIG. 1 in accordance with various aspects described herein.

FIG. 2A is a block diagram illustrating an example, non-limiting embodiment of a system 200 for automatic machine learning (ML) using optimal hybrid artificial intelligence formulation using crowd solutions which may function within the communication network of FIG. 1 in accordance with various aspects described herein. The system 200 may be implemented using conventional processing systems, including one or more processors and a memory that stores data and executable instructions that, when executed by the processing system, facilitate performance of a number of operations. The operations can include data processing, data communication either locally or over a variety of networks and data storage and retrieval.

The system 200 and method implement automatic machine learning processes which selectively utilize various components of different crowd-submitted solutions for optimally solving machine learning problems. The approach exploits the following components (of which 5 components are listed here, but other components could also be possible) for improving the prediction of machine learning algorithms:

1) utilizing additional data to help in the prediction,
2) designing more predictive derived data, also referred to as features or a data pipeline, from existing data,
3) utilizing different or more predictive algorithms, and/or
4) optimizing the parameters in a given algorithm, and/or
5) utilizing different techniques for validating the model performance (e.g. different cross-validation approaches such as form a predictive model using the full training set, or form the model by breaking the training set into sub-training sets, and forming individual models which are then "combined" to an overall model).

The system 200 automatically explores and iterates through each of these five or more components across various individual machine learning solutions, possibly submitted from a crowd of other users, by forming new hybrid solutions and grading each hybrid solution against an objective score and ranking hybrid solutions according to score. The scores may be posted, for example onto a leaderboard. The best ranking overall solution is the one which ranks the best on the leaderboard. The best ranking solution may often consist of a hybrid conglomeration of the five or more aspects across the individual solutions. The automatic exploration and iteration by the system through possible inputs to the machine learning algorithm from other solutions achieves a higher level of accuracy while reducing the resources used for data processing.

Finding better machine learning solutions often consists of trying various data sets, features, algorithms, or algorithm parameters, or cross validation strategies, where different solutions for such come from different people. It is not uncommon when different people work on a machine learning solution that the combined effort results in the best solution. Different people naturally think about or solve the problem differently based on their subject matter expertise background. For example, business experts have experience which may lend different intuition on what type of data to use or data features would be most relevant. Expert data engineers may have certain data processing capabilities that may allow forming otherwise unavailable data sets or features to be created. Machine learning engineers may have particular expertise on implementing or tuning different machine learning algorithms, or such as expertise in turning Gradient Boosting Machine algorithms, or expertise in Deep Learning approaches. The resulting combined solution, collecting the expertise of multiple contributors may be called an ensemble solution. The ensemble solution often outperforms any individual solution sometimes by a large margin.

Successful machine learning solutions are important in many areas of endeavor, including manufacturing, online commerce, fraud detection, retail sales predictions, and any other system where there are a large number of diverse inputs that can be quantified as data and analyzed. Improvements in prediction on some problems may have large monetary effects, particularly for companies or solutions operating at large scale. Examples include online recommender systems and fraud prediction at large companies. Improvements in prediction that afford more useful recommendations to humans, or which better predict situations that could result in fraud loss, can greatly affect operations of a business or other entity. An improvement of a very small percent in accuracy may have a huge monetary impact, so that finding and enabling such machine learning improvements are critical to a business, process or other endeavor.

While ensemble or hybrid solutions nearly always result in better solutions, the problem of allowing each type of expert, including business experts, data engineers, and machine learning engineers, for example, to contribute to the solution is often hindered due to many factors. Some of these factors include the following.

1) Lack of Awareness: the fact that a machine learning problem even exists may limit people from contributing,
2) Lack of Collaboration: cross-team boundaries or political boundaries within an organization may limit the best experts from one team from contributing their particular aspects, such as new data, data features or machine learning algorithms, or
3) Lack of Cross Solution Optimization: even when multiple machine learning solutions exist, finding the best parts of each, such as relevant data sets used, particularly useful data features created, or superior tuned machine learning algorithms or parameters, are not discoverable or readily usable. If a ML solution produces a particularly good result, it has been difficult or impossible to learn exactly what aspect of that ML solution provides the advantage.

Even when sharing of ML solutions is possible or does occur, it is difficult to know how much better a solution is. Typically, it can be proved that a solution is better than chance or a random solution. However, it difficult to know if and by how much any combination of data, features, algorithms and parameters is an improvement over another solution. Moreover, it is difficult to determine which particular data set, feature set, algorithm, validation technique, and parameter set provided a resulting improvement, and to quantify improvements.

There is benefit in crowd sourcing or asking multiple contributors how they would solve a problem or have solved a problem. Final solutions produced in this manner may be evaluated and even quantified to conclude which solution is the most predictive. However, there exists no way to examine the results produced by mixing and matching different data, features, algorithms, validation techniques, and parameters from different proposed solutions to produce final problem solutions. Current mixing and matching of solutions is typically random, undirected and ad hoc, such as based on informal comparisons and conversations among colleagues. Some online services provide systems for finding and publishing data sets, exploring and building models in a web-based data-science environment, and entering competitions to solve data science challenges, but participation and collaboration is largely uncontrolled and random.

The system and method of the subject disclosure propose a solution to overcome these limitations. The system and method may receive information about a business problem from a user. The system and method may employ an automated process to look across all crowd source submissions and pick out all possible combinations of different data, features, algorithms and parameters and mix and match them all to find out the best solution. Each combination of solutions is scored and ranked. Rankings, with scores, may be made available on a leaderboard to identify and quantify best solutions. At times, evaluating all combinations may become "un-wieldy" due to the total number of combinations and time it would take to evaluate each one. For instance, if we had 10,000 submissions on the leaderboard and each had 5 components submitted, the total number of combinations to evaluate would be on the order of 10,000^5, not practical. In these situations, a "smart search across" the component space is merited, and techniques such as simulated annealing, genetic algorithms or the like can be used to find a hybrid solution that is better than any individual solution but perhaps not the global optimum.

In some embodiments, the leaderboard rankings, along with information about ranked models, may be provided in a human readable form to a user for review and selection of a winning ML model. The selection may be based on the leaderboard ranking or other factors such as computation efficiency, explainability and understanding of the model, simplicity, etc. Upon user selection, the winning ML model may be deployed or put into production for future operation. In other embodiments, if a model is determined successful, it can be selected as the winning ML model and can be converted to an application programming interface (API). One goal of the process is to produce a model that can be used to score future results. After conversion to an API, when new data is received by the API, it will be provided to the model and the model will score the new data.

FIG. 2A illustrates an exemplary non-limiting embodiment of a system 200 for automatic machine learning (ML) using optimal hybrid artificial intelligence formulation using crowd solutions. The system 200 includes a user 202, a hybrid machine learning (ML) system 204, and other users 206.

The user 202 may be an entity such as a business organization, or an individual operating within such an entity. The user 202 operates or has access to a data processing system for collecting and managing data and communicating with, for example, the hybrid ML system 204 and the other users 206. In one example, the hybrid ML system 204 communicates over one or more networks, including with internet, with the user 202 and the other users 202. In particular embodiments, the hybrid ML system 204 communicates using a web accessible interface in which web pages are presented on computing devices of the other users 206 and the user 202. The user 202 can use the web interface to provide information about the business problem 220 and to receive information about the leaderboard 216. Similarly, the other users 206 can use the web interface to receive information about the business problem 220 and to receive information about the leaderboard 216, and to provide information about proposed ML solutions to the hybrid ML system 204. Other communication systems and protocols may be used in addition to or in place of a web interface for communicating with the hybrid ML system 204.

The user 202 has a business problem 220 that needs a ML solution. The business problem 220 may be of any suitable nature. Examples of business problems that may benefit from the system and method include fraud detection, targeted advertising, financial forecasting, and personalization of customer experience to name a few. In general, the business problem 220 is characterized by a dataset collected over a time period which may be months, quarters or years. The data of the dataset may include geographical data such as address or residence information. The data may include demographic information such as age and income for a population of, for example, customers or clients or purchasers of products or warranty claimants. The data may include behavioral information or psychographic information, information related to advertising and product purchases. The data of the dataset may be organized in any suitable fashion such as a multidimensional matrix. The dataset may be growing over time or static. The dataset of the problem 220 lends itself to solution by a machine learning system such as hybrid ML system 204.

The user 202 provides to the hybrid ML system 204 information about the business problem 220, a dataset, and a scoring method. The scoring method may be any suitable technique for comparing results of ML algorithms. Examples include a logarithmic loss or log loss method, root mean square error, etc.

Generally, a ML model may be characterized by a plurality of components. These components include a starting or base dataset, any supplement dataset that can be "joined" to the starting data set; a set of features or a data pipeline; a machine learning algorithm; techniques to validate that the algorithm will work as expected; and parameters for the machine learning algorithm. Developing an initial machine learning solution to the business problem 220 involves selecting the base and supplemental datasets, a feature set, an ML algorithm, and validation technique, and a parameter set.

Addressing a predictive problem starts with a base dataset, such as the existing data associated with the problem. Data scientists consider if there is other supplemental data to add to the dataset, comparable to adding other columns to the dataset. In an example, one problem seeks to predict sales on a given day. However, daily sales might depend on the weather on that day. If weather is not currently in the dataset, the data scientist may add weather data to the dataset. Similarly, other incremental data may be added if the other incremental data is predictive.

Second, the data scientists might develop new features. Features are extensions or transformations of existing data. For example, sales next week might be a function of the sales for the current week plus an average of sales for the previous four weeks. The average past sales data would be a new feature, or a new column in the dataset used for a ML model to predict sales next week. Also, transformations of existing data may be taken, such as the logarithm or an exponential function on a column of data, or multiplying two columns together, or convolving one or more columns. These are transformations that create new features. New features in the data may also be referred to a new data pipeline.

Third, the data scientist may use differing techniques for validating a model will perform as expected when predicting events in the future. Examples of validation techniques include cross-validation, leave-one-out validation, and bootstrap validation. In n-fold cross validation, and integer n is chosen (usually 5 or 10), the data scientist splits the training dataset into n equal sized pieces, trains the algorithm on n−1 of those pieces, and then validates the results on the remaining, held-out piece. Leave-one-out validation is cross-validation when n is chosen to be the number of rows in the data set. In bootstrap validation, training data are sampled from the original dataset with replacement, and model validation takes place on data not in the sample. Differing choices of validation may provide better real-world performance approximation, depending on the problem at hand.

Data scientists may also try different machine learning algorithms. Examples of machine learning algorithms include straight linear prediction algorithms, a random forest algorithm, smart decision tree algorithms, and neural network solutions. Most data scientists are not experts at all of these and tend to have favorites or preferred algorithms, meaning some possible algorithms may not be tried during development of an initial ML solution. Additionally, the platform or the data scientist may submit or evaluate machine learning algorithm solutions from AI robots. Also, optimizing an algorithm requires expertise and use of different parameters.

The hybrid ML system 204 includes a ranking process 208, a select hybrid components process 210, training data 212 and test data 214. In the illustrated embodiment, the hybrid ML system 204 includes a leaderboard 216 and an application programming interface (API) 218. The hybrid ML system 204 operates to develop one or more ML solutions to ML problems such as business problem 220. The hybrid ML system 204 in exemplary embodiments is implemented using a processing system including at least one processor and a memory storing instructions to control operations of the processing system. The hybrid ML system 204 may receive information about the business problem 220 including the dataset and scoring method from the user 202 and develop an initial ML solution from these inputs. In alternative embodiments, the hybrid ML system 204 may receive the initial ML solution along with the information about the business problem 220 and the dataset and the scoring method from the user 202.

The ranking process 208 operates to score and rank the ML solutions produced by the hybrid ML system 204. Any suitable scoring system or process may be implemented. For example, consider that a log loss scoring is used. Logarithmic loss, or log loss, measures performance of a classification model where the prediction input is a probability value between 0 and 1. The goal of a machine learning model is to minimize the log loss value. A perfect model would have a log loss of 0. Log loss increases as the predicted probability diverges from the true outcome. Log loss considers the uncertainty of a prediction based on how much it varies from the true outcome. Log loss is particularly useful for comparing models. For any given problem, a lower log-loss value means better predictions. Other scoring systems may be substituted, depending on particular aspects of the data involved and model used. Examples include average error and root mean square (RMS) error. The iterative selection and evaluation of all combinations and subsequent solution scoring and ranking may be done exhaustively, or it could be done through heuristic search approaches such as simulated annealing, genetic algorithms or similar In some embodiments, the ranking process 208 generates a ranked list of ML models received by or developed by the hybrid ML system 204. The ranked list of ML models may be displayed on leaderboard 216. FIG. 2B shows examples of leaderboards 232, 234 for a particular machine learning problem.

The select hybrid components process 210 receives other ML solutions from the other users 206 and selects components of the other ML solutions to identify a best ML solution. The select hybrid components process 210 provides training data 212 to train each respective ML solution to train the ML solution. The select hybrid components process 210 provides test data 214 to each respective ML solution to test the ML solution.

In exemplary embodiments, training data 212 includes all information, including a target value to predict. In some exemplary embodiments, the test data 214 omits the target value. For example, in a sales forecasting problem, the competing models may be given as training data sales data for January and February of a given year but not for March of the year. The test data includes March data and the model is evaluated by the ranking process 208 by its accuracy for the prediction for March sales. The accuracy of predicting the target value using the test data 214 when processing the test data is the basis for scoring the model. A more accurate prediction results in a lower log loss score.

The hybrid ML system 204 addresses some of the challenges in creating the best machine learning by openly exposing machine learning problems to a cross discipline crowd of experts represented by other users 206. The hybrid ML system 204 enables collecting from the other users 206 individual proposed solutions such as including or consisting of datasets 222, feature sets 224, machine learning algorithms 226, parameter sets 228 and other available information 230. Each proposed solution received from the other users 206 is individually ranked by the ranking process 208 and reported on the leaderboard 216. The hybrid ML system 204 then automatically cross evaluates each aspect of the proposed solution to formulate a set of newly created hybrid ensemble solutions and to determine if any of the hybrid solutions outranks the current leaders on the leaderboard 216. In some embodiments, each of the components of the other ML solutions proposed by other users 206, including the dataset 222 for an existing ML model, a feature set for the existing ML model, the algorithm for the existing ML model and the parameters for the existing ML model may be separately selected and combined with components of other ML models of other users 206 of with components of an initial machine learning solution to produce one or more hybrid ensemble solutions.

As noted herein, conventional machine learning development process has a limitation of a lack of awareness of by others of an existing machine learning problem. The system and method of the subject disclosure address this limitation in that, in some embodiments, all machine learning problems from users such as the user 202 are exposed or posted on an open platform for collaboration or competition. In some embodiments, the initial components exposed include the business problem 220, a dataset and a scoring method.

A conventional machine learning development process has a further limitation of lack of collaboration by other data scientists on machine learning problems. The system and method of the subject disclosure address this limitation in that, in some embodiments, the hybrid ML system 204 solution breaks down the machine learning problem into components allowing contribution not only of an overall solution proposed by another user but also individual components of the proposed overall solutions which may be contributed by different types of experts. Such individual components may include new data that could be combined with the existing data. For example, business experts and data engineers may contribute or suggest new data sets such as data 222 for use in a hybrid solution. Further, a data pipeline output, or the final derived set of features that could be used as inputs to machine learning algorithms, could be used. For example, data engineers and data scientists may contribute their feature set such as features 224. Still further, the machine learning algorithms and parameter optimized versions of the algorithms may be contributed, such as such as algorithms 226. For example, data scientists can contribute their machine learning models. Still further, parameter sets optimized or developed for one or more models, such as parameters 228, may be contributed. Still further, validation techniques may be contributed. For example, data scientists may use n-fold cross validation or bootstrap validation to approximate future performance of their machine learning models. Other components could further be identified and added to the platform in the future.

As discussed in the subject disclosure, any machine learning solution can be characterized by a group of components. Generally, these components include a dataset, a set of features of data pipeline, a machine learning algorithm, and parameters for the ML algorithm. Thus, the hybrid ML system 204 of FIG. 2A receives from the other users 206 the data 222, the features 224, the algorithms 226 and the parameters 228 developed by, used by or submitted by respective other users 206. In some embodiments, other aspects may be used to characterize a ML solution or ML problem. Accordingly, hybrid ML system 204 may receive other available information 230 from the other users.

Further, in some embodiments, the hybrid ML system 204 may receive these components in discrete form. For example, a proposed solution submitted by another user might include components including a dataset, additional data features, a ML model and parameters for the model. Each of the components may be in a separate data file, such a file in the Python programming language. Each separate component or data file can be individually processed by the hybrid ML system 204. For example, each component can be combined with components of other proposed ML solutions or an initial ML solution, where the initial ML solution is received from the user 202 or is developed by the hybrid ML system 204. The components of each proposed ML solution from the other users thus can be mixed and matched to produce hybrid solutions. Each hybrid solution can be scored and ranked by the ranking system 208 and added to the leaderboard 216.

In other embodiments, a proposed solution may not be received by the hybrid ML system 204 as five or more separate components. In such embodiments, the hybrid ML system 204 may access the proposed solution and process it to extract or determine or develop the requisite components, including data, features, algorithms, parameters, and cross-validation techniques. The extracted or determined components may thus be used by the hybrid ML system 204 for combining with other components of other ML solutions.

In other embodiments, any individual solution may contain only one component, and the hybrid solution can evaluate that one component against all other components to see if an overall solution scored better than any other solutions.

As noted, a conventional machine learning development process has a further limitation of a lack of cross solution optimization. As discussed, the hybrid ML system 204 may develop an optimal ML solution evaluating all the combinations of the components submitted by the individual solutions from other users 206 and formulating different proposed new hybrid solutions. For example, a new hybrid solution could use the output of the data pipeline from one submission combined with the machine learning algorithm from another proposed solution to develop the best overall solution. Respective solutions are scored and ranked by the ranking system 208.

FIG. 2B depicts an illustrative embodiment of a leaderboard showing ranking of machine learning solutions to a machine learning problem in accordance with various aspects described herein. FIG. 2B shows a first leaderboard 232 and a second leaderboard 234. Each leaderboard 232, 234 reflects a scoring and ranking process produced by, for example, the ranking system 208 of FIG. 2A. Each leaderboard 232, 234, lists machine learning models and a score reflecting the predictive performance of the listed models. Both leaderboards 232, 234 were produced with inputs of a business problem, such as business problem 220 of FIG. 2A, of "forecast the number of widgets needed 12 months out," and an example data set D which includes historical widget actual sales per month from the last 3 years.

Leaderboard 232 reflects a system in which a set of users have submitted proposed machine learning solutions which have been scored and ranked. For example, at rank 1 is a solution 236 which used a random forest machine learning algorithm labelled Random Forest 1. The proposed solution 236 was submitted by an individual designated Name 1 and produced an error score 0.45, where, as indicated, a lower score is better or a more accurate solution. Similarly, at rank 2 is a solution 238 which used regression learning algorithm labelled Regression A. The proposed solution 238 was submitted by an individual designated Name 2 and produced an error score 0.56044688. Other proposed solutions are scored, ranked and listed as shown in leaderboard 232 in FIG. 2B.

Leaderboard 234 reflects a system in which a hybrid artificial intelligence solution evaluates proposed solutions submitted by other users and also develops and evaluates all the combinations of the components of the proposed solutions submitted other users. Leaderboard 234 shows in more detail the components of each listed solution, including datasets ("Incr. Data"), feature set ("Data Pipeline Output") and machine learning algorithm ("Model") that formed each respective solution. Leaderboard 234 includes a first group 240 of ranked solutions and a second group 242 of ranked solutions. In the particular example of leaderboard 234, the first group 240 includes the proposed solutions submitted by other users, including solution 236 and solution 238. In the leaderboard 234, however, those proposed solutions are ranked fifth and sixth, respectively.

Higher ranked spots on the leaderboard 234 are occupied by hybrid machine learning solutions. Thus, solution 244 is ranked first. Solution 244 is identified as Hybrid 1. The solution 244 is listed as using incremental data sets D1 and D2 and data pipeline outputs DP1, DP2 and DP3. The solution 244 is listed as using as a machine learning model an ensemble of two models, model2 and model4. The contributor of solution 244 is indicated as AI.Hybrid.bot, indicating that the solution was developed automatically by processing components of other submissions to develop the solution 244. The first-ranked solution 244 achieved an error score of 0.1

While exposure of a given machine learning algorithm problem is relatively easy through various formats of communication, overcoming the other aspects of collaboration and optimization need additional innovation. For example, consider the following example which contrasts a typical individual machine learning solution ranking as evidenced by the leaderboard 232, with the optimal hybrid AI formulated solution as evidenced by leaderboard 234.

From leaderboard 232, it is clear for solution 236 that the Random Forest 1 solution submitted by user designated Name 1 scored the best. However, it is unclear whether some of the work done by the other submissions in either their additional data sets used, their feature creation or algorithms, could be either used to improve the top-ranking solution 236 or collectively produce a higher ranked solution.

Conversely, as evidenced by leaderboard 234, in accordance with various aspects described herein, the optimal hybrid AI solution such as the hybrid ML system 204 of FIG. 2A, breaks down each submission into its key components, such as new data sets, data pipeline output containing the final feature set, and the machine learning models used. The hybrid AI solution does this either by automatically reading the code submitted as proposed solutions by other users and extracting the components, or by manually asking the users to submit the components. The hybrid AI solution then evaluates all combinations to formulate the best overall solution 244. The leaderboard 234 shows the results of processing all submitted solutions and all solutions developed as hybrids of other solutions.

Notice in this case four hybrid solutions of group 242 beat the individually contributed solutions of group 240 through various forms of using either new incremental data sets combined with different data pipeline outputs and/or different machine learning models. Specifically, the Hybrid 1 machine learning solution, solution 244, utilized incremental data sets D1 and D2 from contributions by Name 1 and Name 3 and took the combined data pipeline outputs DP1, DP2, and DP3. These data pipeline output may have had various novel features formed. For example, at minimum DP2 had new features as it didn't use any new data. Solution 244 also combined the ensemble solution of two different machine learning algorithms, model 2 and model 4, which may have had algorithms that predicted different things better. The resulting hybrid solution overall prediction of solution 244 was significantly better, as evidenced by it having had the lowest error score.

Figure 2C:
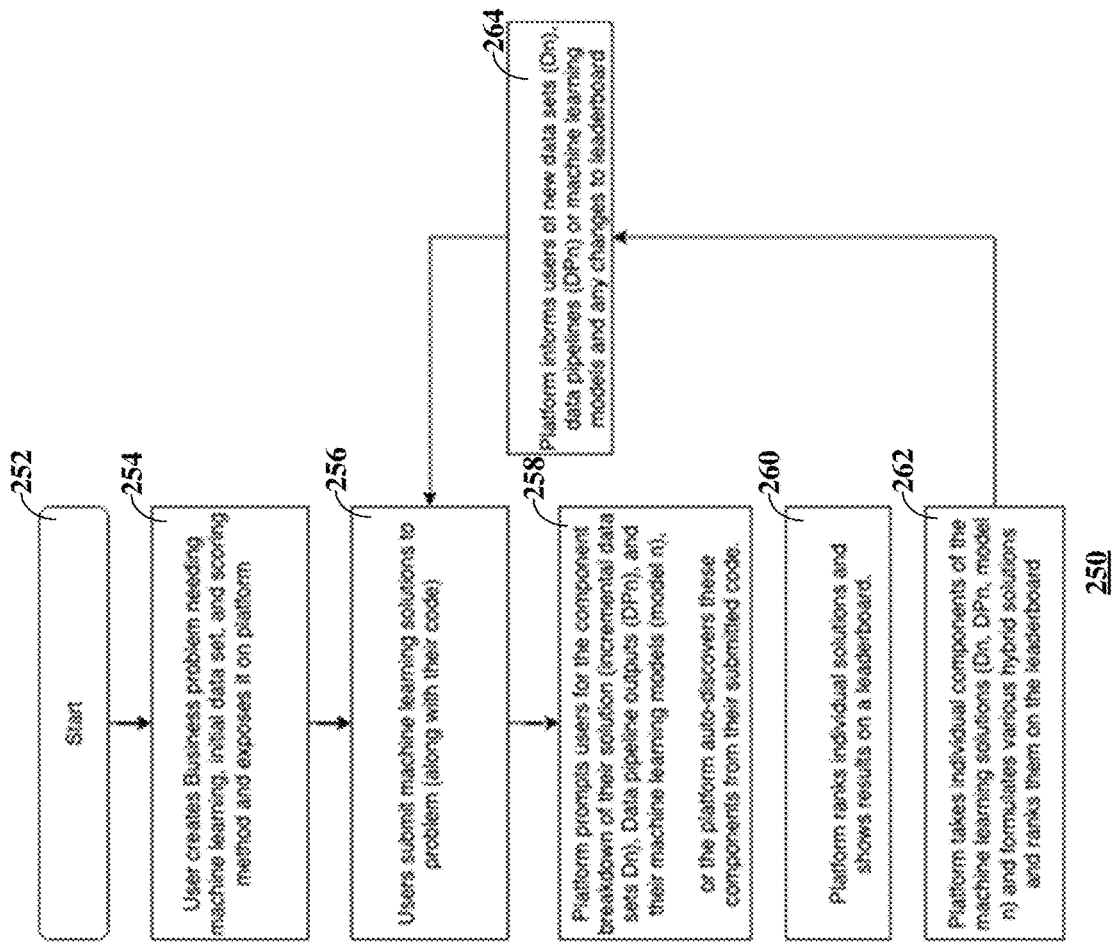
FIG. 2C depicts a flowchart showing an illustrative embodiment of a method in accordance with various aspects described herein.

FIG. 2C depicts a flowchart showing an illustrative embodiment of a method 250 in accordance with various aspects described herein. FIG. 2C shows a typical workflow flowchart of how an optimal hybrid AI platform in accordance with the subject disclosure interacts and formulates hybrid machine learning solutions. The method begins at block 252.

At block 254, a user creates or identifies a business problem requiring a machine learning solution. In general, the business problem may be characterized by a dataset collected over a time period. The data of the dataset may include geographical data, financial data, demographic data or any other data. The dataset of the problem 220 lends itself to solution by a machine learning system such as the hybrid ML system 204 of FIG. 2A. The user further identifies a scoring method for the business problem, such as log loss scoring. The business method is exposed to other users for solution. In some embodiments, the user may communicate one or more data files to a platform maintained by a data processing system, for example, using a web accessible interface. The platform may implement the hybrid ML system 204 of FIG. 2A. The platform may provide for data communications among users, including by provided access to web pages by web browsers of user devices, by data of a leaderboard such as the leaderboard 216 of FIG. 2A or the leaderboard 234 of FIG. 2B. The user may use a web interface to communicate data about the business problem, the dataset and the scoring method, to the data processing system that establishes the platform. Further, the platform may present a web accessible interface to other users to review the business method.

At block 256, other users review the business problem and submit one or more proposed solutions to the platform. In some embodiments, respective other users may use a web interface to submit one or more data files defining respective solutions. Each respective solution may include, for example, a respective dataset, a respective feature set, a respective machine learning algorithm and a respective parameter set.

At block 258, the platform prompts a user submitted a proposed solution for the component breakdown of the proposed solution. For each respective proposed solution, the platform may prompt the user to submit a respective incremental data set Dn, a respective data pipeline output DPn and a respective machine learning model modeln. In other embodiments, the platform may automatically discover these respective components from code submitted by the other users.

At block 260, the platform evaluates the respective proposed solutions submitted by the other users. The evaluation may be in any suitable manner. In some embodiments, a log loss algorithm may be used to establish a respective score for each respective proposed solution and to establish a rank for each proposed solution. The proposed solutions may be displayed in a leaderboard such as leaderboard 234.

At block 262, the platform selects combinations of datasets Dn, data pipeline outputs DPn, also referred to as feature sets, and machine learning models modeln, and formulates one or more hybrid solutions. A hybrid solution is one which includes at least two components from two different users and is thus distinct from the initial solution to the problem submitted by the user and the proposed solutions submitted by other users. In some embodiments, the platform may include among the combined components parameter sets for the models. In some embodiments, a parameter set may be considered to be a part of or an aspect of an associated model. Each hybrid solution is scored, for example, using a log loss technique. Using the scores for each model, the models are ranked on the leaderboard.

The leaderboard is used to communicate results of the operation of the platform. At step 264, the platform informs user including the original user who submitted the business problem and other user who submitted proposed solutions, about the current ranking on the leaderboard and any changes to the leaderboard. Further, the platform informs the users of new datasets Dn, new data pipeline DPn or machine learning models modeln that have been submitted. For example, in FIG. 2B, the leaderboard 234 lists each dataset, data pipeline and model used by each solution so that users viewing the leaderboard 234 have information about those components.

After block 264, control returns to block 256. Users may continue to submit new proposed solutions that may achieve a better score on the leaderboard. In this manner, the platform may implement a collaborative system for developing a best or optimal machine learning system. Also, the platform may implement a competition, where users are competing to achieve the best score on the leaderboard.

In some embodiments, information about the results of the scoring and ranking process may be presented to the user for review. In one example, the user may view the ranked results for the various proposed solutions and the hybrid solutions in a list such as the leaderboard 234. The user may determine a winning solution or best solution or preferred solution and select a solution to solve the initial business problem. The selected solution may be selected by the user based on the score determined for the solution or some other aspect, such as the nature of the data used for the solution, the nature of the model used, etc. For example, the highest-ranked solution may use a machine learning model that requires too much memory or too much data processing capacity or would require an inappropriate amount of time to run. Such a solution, even though highest ranked, may be impractical. Accordingly, the user may select another solution which is more appropriate for the user's requirements and capabilities and which still adequately solves the user's problems.

The benefits of this solution are tremendous since a few percentage improvements in AI solutions across important business problems like fraud, recommendation engines can result billions of dollars improvement to a company's bottom line. Indeed, this is illustrated by even the rewards for some machine learning solutions being in the millions of dollars as companies like the Netflix ask for improvements to their recommendation engine machine learning as in the Netflix challenge. This challenge was run in the fashion of typical machine learning challenges with a $1 million prize which actually was won by an ensemble or hybrid machine learning approach by a combined team), who informally collaborated to formulate their hybrid ensemble solution.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
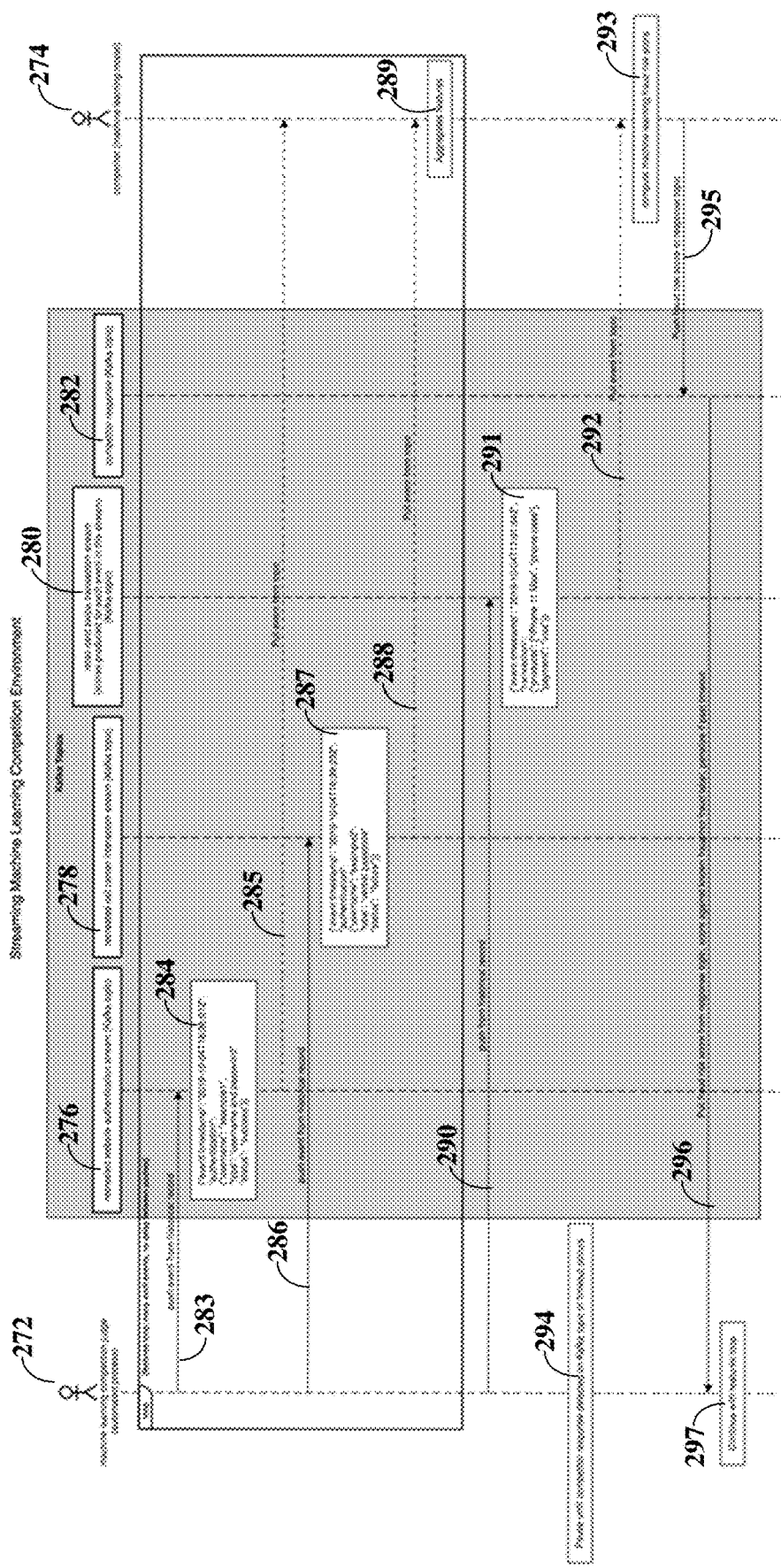
FIG. 2D is sequence diagram illustrating a model scoring phase of a method in accordance with various aspects described herein.

FIG. 2D is sequence diagram illustrating a model scoring phase of a method 270 in accordance with various aspects described herein. The method 270 is an embodiment for addressing a problem related to timing of data used for training a machine learning model compared with timing of data that is available when the model is deployed.

Many machine learning solutions are deployed in streaming situations where data is flowing into the system continuously through time. For example, anti-fraud platforms may incorporate up-to-date information about account activity. In another example, targeted advertising recommender systems may leverage the most recent websites browsed by an individual. Predictions must be made by the model at a single point in time, however. Predictions by the model are triggered by an event like a customer submitting an order or an individual loading a website with space available for a targeted ad. The machine learning model may make use of any data available to the system before the trigger event but has no knowledge of additional data, referred to as future data, that flows into the system after the trigger event.

However, during the design phase of these machine learning solutions, the creators of machine learning models, referred to as modelers, often have access to data sets containing information from both before and after the trigger events. Modelers add features using batch data processing, during training, where calculations and transformations may be done to the entire data set at once. In streaming data processing, after model deployment, calculations and transformations are done one at a time as new data flows in. In a streaming situation, it is impossible for data occurring after the trigger event to be used in calculating features. In a batch situation, however, it is very easy to use data from the future to calculate features.

This use of future data is called data leakage, when a modeler makes data available during the design phase that would not be available to the model when the model is deployed. This type of data leakage may be disastrous to machine learning models because features derived from future data are often the most predictive since they were directly caused by the trigger event. The problem arises because the model leans too heavily on features from the future instead of learning from past features available in a deployment environment. For example, in a targeted advertising recommendation model, browsing history of an individual may be used to predict if the individual will click on an ad. If the modeler includes websites viewed after the ad was shown to the user when calculating features, the model may learn that the most important feature is whether the ad URL is present in the browsing history. This model performs perfectly during the design or training phase but may be useless when deployed and tested.

A further problem arises in that machine learning design conditions do not match deployment conditions for the machine learning model. The modeler must manually exclude future data when calculating each feature, which may be a tedious and error-prone process. Furthermore, in the context of a system, method and platform for machine learning from crowd solutions, unless there is a method for controlling the availability of data in time, models that utilize future data leakage, either accidentally or deliberately, will rise to the top of the leaderboard. In other words, if the crowd solution platform mirrors batch data processing conditions, the leaderboard will optimize for these batch conditions. If the crowd solution platform mirrors streaming data processing conditions, the leaderboard will optimize for the deployment scenario.

FIG. 2D illustrates one embodiment of a method 270 for a machine learning competition. The method 270 illustrates a sequence diagram showing interaction between a machine learning competition judge 272 and a competitor 274. The judge 272 is an automated process implemented on a processing system including one or more processors and a memory storing instructions for controlling the processing system. The competitor 274 is a machine learning model similarly implemented on a processing system including one or more processors and a memory storing instructions for controlling the processing system. The judge 272 and the competitor 274 may be implemented on the same processing system or on different processing systems in data communication over a network such as the internet. The judge 272 may implement or be part of a machine learning competition including a number of other competitors in addition to the competitor 274. The process of FIG. 2D illustrates one aspect of the machine learning competition.

In the exemplary competition of FIG. 2D, a financial institution designated Bank of Example (BofE) has data representing point-of-sale card swipe transactions Such transactions may be a target for fraudsters who seek to defraud BofE by mimicking a legitimate transaction at a point-of-sale device. BofE wishes to develop a real-time machine learning model that can receive a call to the machine learning model when a transaction occurs and, in response, provide a fraud risk score to the point-of-sale device. Based on the fraud risk scored returned by the model, the point-of-sale device will either decline the transaction as fraudulent or allow the transaction to proceed. The model must provide the risk score during a time period within 250 ms of the call to the machine learning model so as not to affect the customer experience. Further, in the planned system, the customer has to authenticate verbally on a call to complete the transaction. BofE establishes a machine learning competition the purpose of which is to provide such a model that can be plugged immediately into production systems with little or no additional engineering work.

There are three datasets in the competition. A stream of authentication events 276 on BofE's website is a first dataset. A stream of call center authentication events 278 from BofE's call centers is a second dataset. A stream of retail card swipe transaction events 280, together with a Boolean label indicating whether the transaction was fraudulent or not, is a third dataset. The data of the three datasets may be legitimate data provided by BoE or may be false data produced for the competition, or a combination of the two. Every time an event occurs in the stream of retail card swipe transaction events 280, the machine learning model of the competitor 274 will be expected to produce a fraud risk score, illustrated as the stream of competitor's responses 282. In other words, data in the stream of retail card swipe transaction events 280 are the events that trigger model scoring.

Examples of the datasets provided to the competitors and used in the competition are shown here. The first example shows the stream of authentication events 276 from BofE's call centers is a second dataset:

Website Authentication Events
```
{"event timestamp": "2019-10-04T16:36:01Z",
    "authentication":
    {"username": "example1",
    "type": "username and password",
    "status": "success"
    }
}
{"event timestamp": "2019-10-04T16:42:34Z",
    "authentication":
    {"username": "example 2",
    "type": "username and password",
    "status": "failure"
    }
}
```

The second example is the stream of authentication events 278 from BofE's call centers:
Call Center Authentication Events
```
{"event timestamp": "2019-10-04T16:39:23Z",
    "authentication":
    {"username": "example 2",
    "type": "verbal passcode",
    "status": "failure"
    }
}
{"event timestamp": "2019-10-04T16:40:21Z",
    "authentication":
    {"username": "example 2",
    "type": "verbal passcode",
    "status": "success"
    }
}
```
. . .

The third example shows the stream of retail card swipe transaction events 280 together with a Boolean label indicating whether the transaction was fraudulent or not.
Retail Point-of-Sale Card Swipe Events
```
{"event timestamp": "2019-10-04T17:01:23Z",
    "transaction":
    {"products": ["iPhone 11 Max", "phone case"],
    "payment": "visa",
    "fraud": true
    }
}
{"event timestamp": "2019-10-05T04:43:00Z",
    "transaction":
    {"products": ["big mac", "large coke"],
    "payment": "visa",
    "fraud": false
    }
}
```
. . .

It should be noted that these examples are meant to be illustrative of one embodiment only. Depending on implementation, goals and requirements of an actual model design or competition, other examples may be developed as well.

In a system and method in accordance with various aspect described herein, a traditional machine learning competition structure is mirrored in the training phase of the competition. However, in the scoring phase of the competition, the deployment conditions that the model will see in production are mirrored as closely as possible.

In the training phase, the system and method in some embodiments provide historical data to the competitor with timestamps representing when the data would have been available to the model. When the model is asked to score a trigger event, any datum with a timestamp preceding the trigger event timestamp is fair game for the model to consider.

The model scoring phase is designed to mimic a real-world streaming model scoring situation, but with consideration for expeditiousness. The machine learning competition employs a judge which is an automated process for determining the performance of the model. The judge replays transactions of the test data through a message queue in the order in which the transactions were received. For efficiency, the judge leaves no temporal gap between the transactions, except in the triggering event feed. So, for example, in the website authentication events dataset described herein, the two example transactions had timestamps 2019-10-04T16:36:01Z and 2019-10-04T16:42:34Z. That is, there was a 6 minute 33 second gap between these records when they were observed in their originating system. When they are replayed as test data for scoring the model by the judge, there will likely only be milliseconds between them. However, based on the information contained in the timestamps, the transactions are guaranteed to be played back in the order in which they were received.

In the competition environment illustrated in FIG. 2D, the judge 272 plays events according to their timestamp information. Events are retrieved from a data store and, according to the time stamp, are presented to the competitor 274. When a score triggering event occurs, such as a retail point-of-sale card swipe in stream 280, the judge 272 pauses all data feeds and waits a specified time, such as 250 ms, to allow for the competitor 274 to provide its score. Once the score of the competitor 274 has been received, the judge 272 continues to replay events until the next triggering event occurs and the process repeats. If the competitor process is unable to provide its score within the time limit, the judge 272 marks the score as timed out and penalizes the competitor 274. In this way, it is impossible for the competitor 274 to leak future data into their risk score and cheat by having access to information that would have not been available in a real-world situation.

If the competitor 274 returns a legitimate score before the allotted time elapses, the score is judged using a machine learning competition scoring metric. Examples of suitable competition scoring metrics include F1 scoring, logarithmic loss, area under the Receiver Operating Characteristics (ROC) curve and precision recall (PR) curve. Any other machine learning competition scoring metric may be used in addition or instead.

The model training portion of the competition method 270 illustrated in FIG. 2D proceeds as usual for a machine learning competition. The competitor 274 is provided with data from historic data streams 276, 278, 280 to be used to derive features to train a machine learning model. The competitor 274 is also provided with a set of known labels on an event of interest. At this point, there is no restriction on whether the competitor 274 leaks data from the future into the model.

The sequence diagram of FIG. 2D describes the model scoring phase. In this diagram, the replay of data is provided by a message queueing system. One suitable example of a message queuing system is Apache Kafka. Other systems may be used as well. Kafka provides a timestamp when an event is written to one of its queues. A queue in Kafka is known as a topic. The timestamps associated with events permit judge 272 to determine if the time limit was exceeded by comparing the timestamp on the retail card swipe steam 280 with the timestamp in the competitor response stream 202.

The method 270 begins when the judge 272 pushes, step 283, an event 284 from the stream of authentication events 276. The event 284 includes the data and timestamp shown in FIG. 2D. At step 285, the competitor 274 pulls the event for processing. At step 286, the judge 272 pushes an event 287 from the stream of call center authentication events 278. At step 288, the competitor 274 pulls the event 287 from the stream 278 and at step 289, the competitor aggregates features of the events.

At step 290, the judge pushes an event 291 from the stream of retail card swipe transaction events 280. The event 291 will trigger model scoring by the judge 272. At step 292, the competitor 274 pulls the event 291 from the stream of retail card swipe transaction events 280 and at step 293 computes its machine learning fraud risk score according to its machine learning model. Meanwhile, at step 294, the judge 272 pauses for a predetermined time while the competitor 274 computes the likelihood the transaction of event 291 is fraudulent. During the pause, the judge 272 suspends presentation of data from any of the data streams 276, 278, 280 so that the competitor does not have access to future data, modelling real world conditions. Pausing may include suspending provision of additional authentication event data such as from the stream of authentication events 276 from the website, the stream of authentication events 278 from call centers and additional transaction event data such as stream of retail card swipe transaction events 280 to the competitor 274 during the predetermined time to prevent the competitor 274 from receiving future data Even though the timestamps are minutes or seconds or more apart, the judge 272 does not provide them in real time, but in a timing that is independent from the timestamp information.

If the time for the competitor 274 to return a result exceeds a predetermined threshold, such as 250 ms, the judge 272 acts to penalize the competitor 274. If the competitor 274 is unable to provide its score within the time limit, the judge 272 marks the score as timed out and penalizes the competitor 274. In this way, no future data is available to the competitor and it is impossible for the competitor 274 to leak future data into the risk score and thereby cheat by having access to information that would have not been available in a real-world situation. The competition environment has the same limitations on availability of future data as a production deployment.

At step 295, the competitor 274 returns the fraud risk score computed by the model of competitor 274. The fraud risk score is placed in stream 280 of competitor responses. At step 296, the judge 272 pulls the competitor response from the stream 280. The response indicates a value of "fraud" or "not fraud" as an indicator of the likelihood that transaction 291 is fraudulent. The judge 272 knows the correct status of the event 292 and so can score the response accordingly. At step 297, the judge 272 continues processing additional transactions, repeating the process shown in FIG. 2D.

The system and method in accordance with features described herein enables several benefits over a traditional system. Traditional machine learning competitions may have an inability to detect a competitor model leaking future data into its predictions. In accordance with the disclosure herein, the competition judge 272 pauses the triggering event feed, step 294, until the specified time out period has passed. If the competitor does not provide a score in the specified time, it is penalized and unable to submit a score for that event, event 291. This makes it impossible to leak data from the future and makes judging a model for real-world robustness very straightforward.

Further, traditional machine learning competitions may evidence a lack of collaboration on machine learning problems. Traditionally, data scientists would participate in machine learning competitions, and if a data engineer wanted to participate, they would be forced to play the role of a data scientist. In accordance with the disclosure herein, in the streaming competition structure, it is unlikely a single individual would have the time or all the requisite skills to build the production pipeline and a highly performing machine learning model necessary to win the competition. As such, collaboration between a skilled data scientist and skilled data engineer may be required to be competitive. Moreover, the disclosed system and method allow data engineers to shine in their area of expertise rather than force them into a different role.

Still further, traditional machine learning competitions have shown some difficulty in moving a machine learning model from a competition into production. In accordance with the disclosure herein, because the scoring phase is designed specifically to mirror a real-time production deployment, the winning model can be put into production with little or no additional engineering effort.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 230 presented in FIGS. 1, 2A, 2B, 2C, and 3. For example, virtualized communication network 300 can facilitate in whole or in part a system and method for developing hybrid machine learning solutions based on components of submitted machine learning solutions, score and rank solutions for selection as a preferred solution to a machine learning problem.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic. Resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
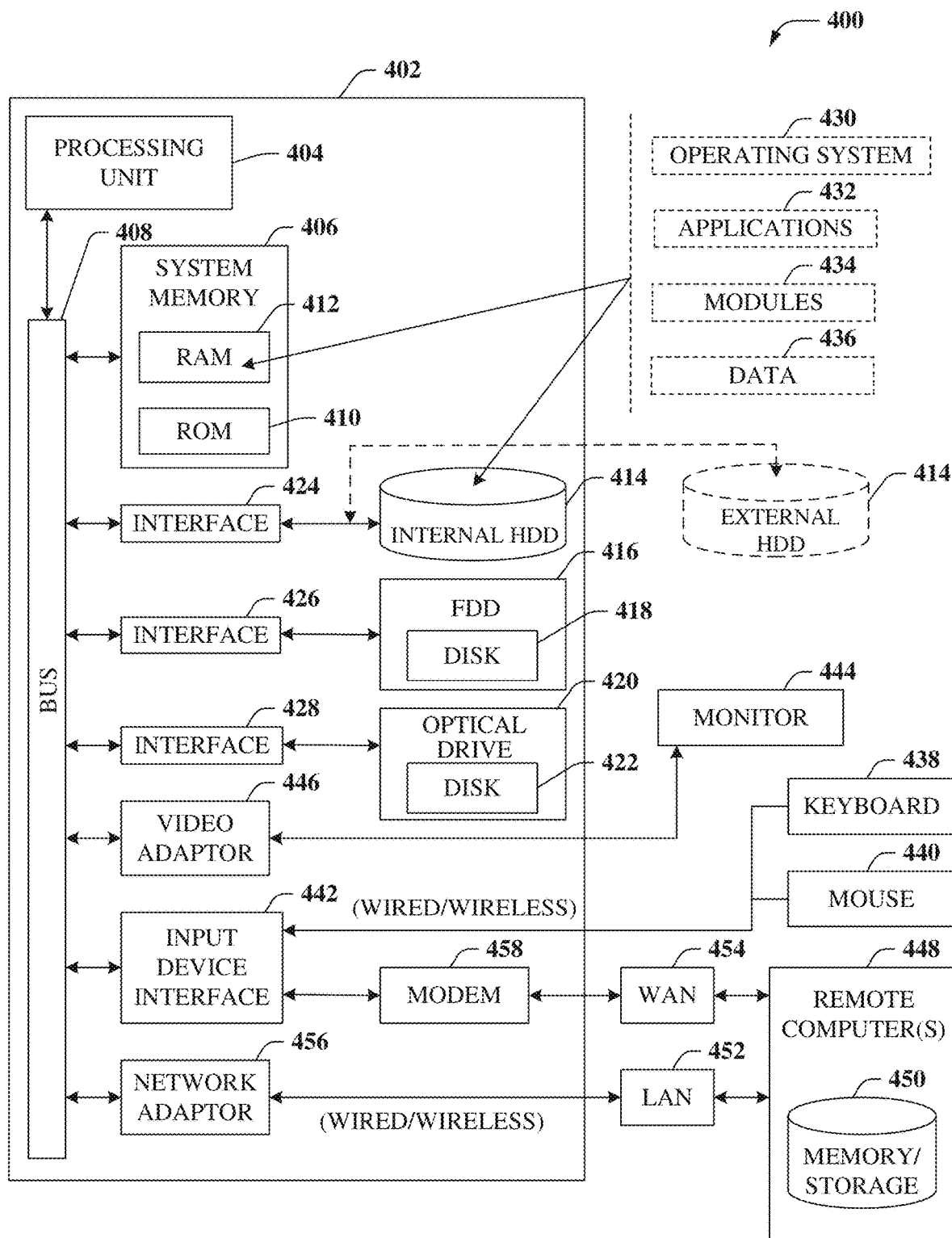
FIG. 4 is a block diagram of an example, non-limiting embodiment of a computing environment in accordance with various aspects described herein.

Turning now to FIG. 4, there is illustrated a block diagram of a computing environment 400 in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a system and method for developing hybrid machine learning solutions based on components of submitted machine learning solutions, scoring and ranking solutions for selection as a preferred solution to a machine learning problem.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example computing environment 400 can comprise a computer 402, the computer 402 comprising a processing unit 404, a system memory 406 and a system bus 408. The system bus 408 couple's system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
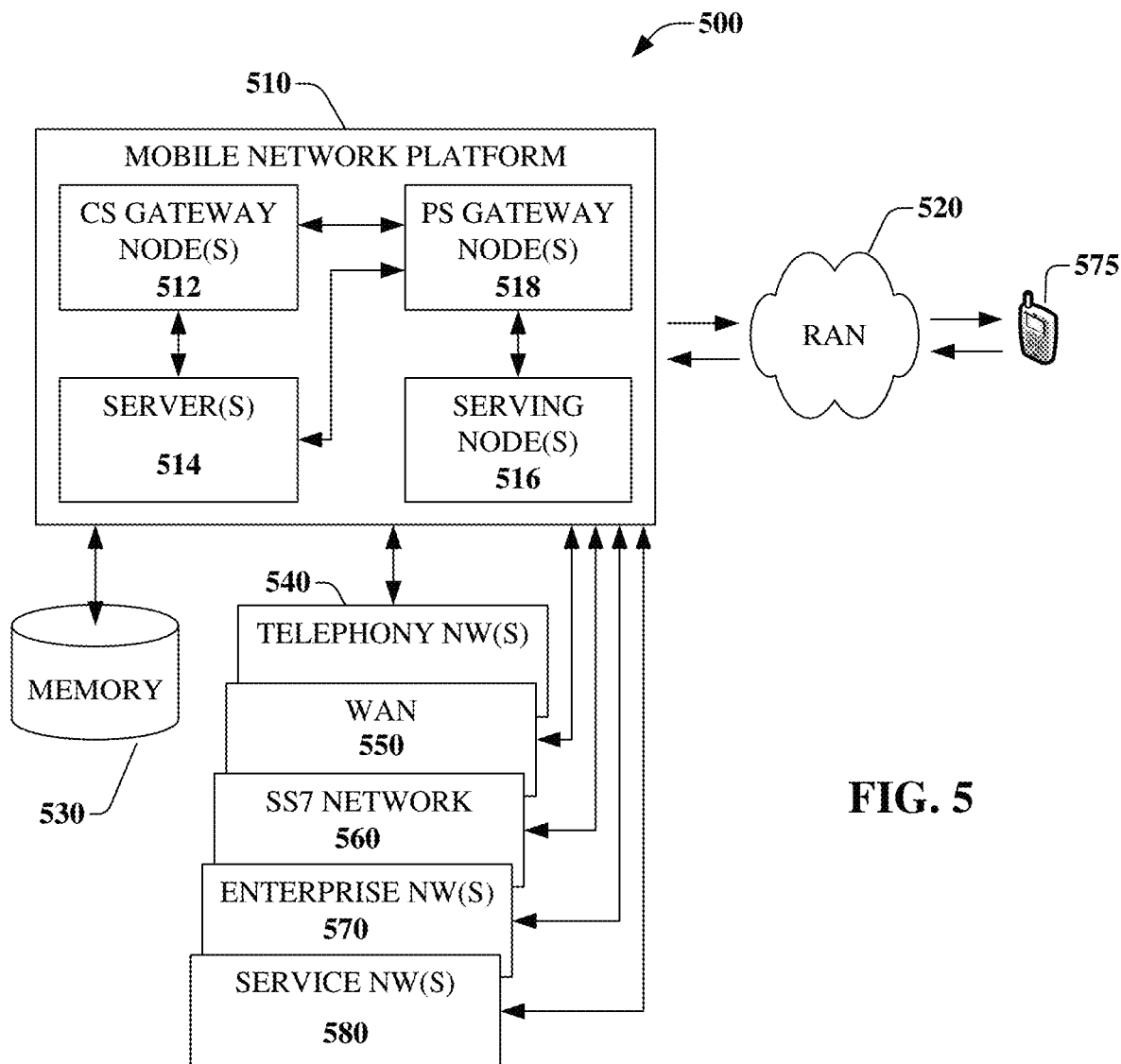
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a system and method for developing hybrid machine learning solutions based on components of submitted machine learning solutions, scoring and ranking solutions for selection as a preferred solution to a machine learning problem. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology or radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
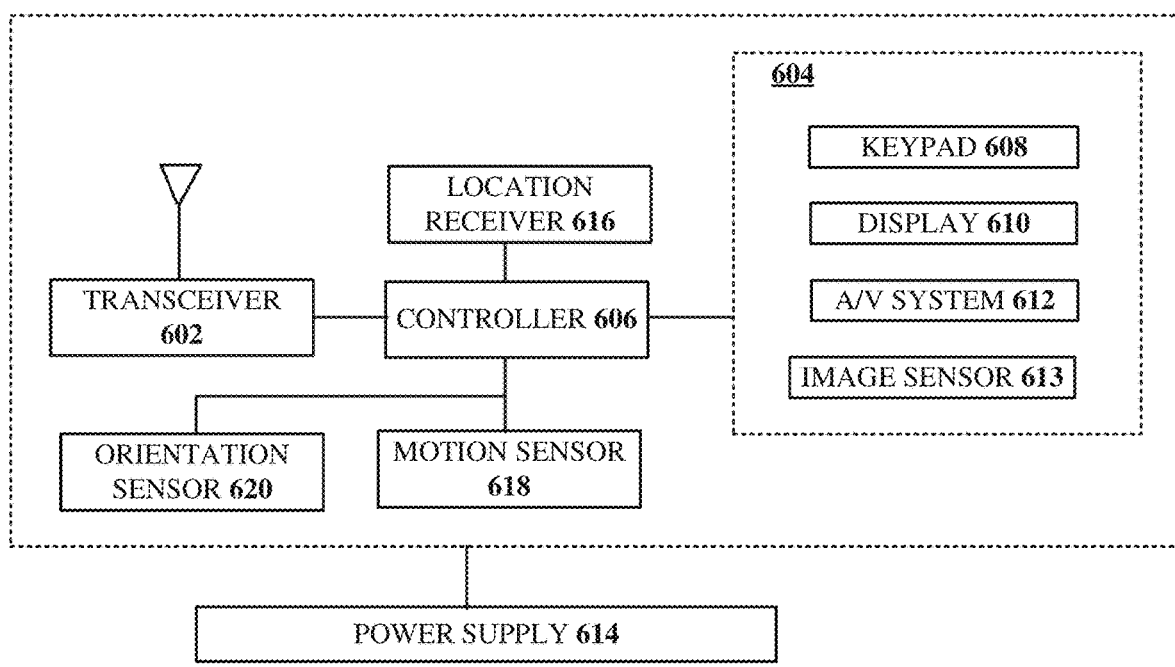
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a system and method for developing hybrid machine learning solutions based on components of submitted machine learning solutions, scoring and ranking solutions for selection as a preferred solution to a machine learning problem.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to pre-determined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
    receiving information about a plurality of machine learning solutions to a machine learning problem, each respective machine learning solution of the plurality of machine learning solutions comprising two or more components;
    scoring each respective machine learning solution of the plurality of machine learning solutions to determine respective scores;
    ranking respective machine learning solutions and an initial machine learning solution, wherein the ranking is based on the respective scores;
    developing one or more hybrid machine learning solutions including at least one component of the initial machine learning solution and at least one component of the plurality of machine learning solutions;
    scoring the one or more hybrid machine learning solutions;
    ranking the one or more hybrid machine learning solutions with the respective machine learning solutions and the initial machine learning solution to produce a leaderboard ranking, wherein the ranking the one or more hybrid machine learning solutions is based on the scoring the one or more hybrid machine learning solutions; and
    receiving a selection input indicating a selected machine learning solution among the one or more hybrid machine learning solutions, the respective machine learning solutions, and the initial machine learning solution.

2. The device of claim 1 wherein the receiving a selection input comprises:
    receiving a human input indicating the selected machine learning solution.

3. The device of claim 1, wherein the operations further comprise:
    conducting a fraud detection competition among the one or more hybrid machine learning solutions, wherein the conducting the fraud detection competition comprises:
        providing, by an automatic process forming a judge of the fraud detection competition, authentication event data and transaction event data to a competitor in the fraud detection competition, wherein the transaction event data comprises information about a potentially fraudulent transaction;
        receiving, by the automatic process, a fraud risk score from the competitor;
        scoring, by the automatic process, the competitor based at least in part on the fraud risk score; and
        if the fraud risk score is not received from the competitor within a predetermined amount of time, penalizing, by the automatic process, the competitor in the fraud detection competition.

4. The device of claim 3, wherein the providing the authentication event data and the transaction event data to the competitor comprises:
    providing the authentication event data and the transaction event data to a hybrid machine learning solution of the one or more hybrid machine learning solutions.

5. The device of claim 3, wherein the operations further comprise:
  pausing, by the automatic process, a time duration corresponding to the predetermined amount of time, wherein the pausing comprises suspending provision of additional authentication event data and additional transaction event data to the competitor during the predetermined amount of time to prevent the competitor from receiving future data.

6. The device of claim 1, wherein the operations further comprise:
  selecting a component of a selected machine learning solution of the plurality of machine learning solutions; and
  developing a hybrid machine learning solution by combining the component of the selected machine learning solution with components of the initial machine learning solution.

7. The device of claim 6, wherein the selecting the component of the selected machine learning solution comprises selecting one of a data set, feature set, a machine learning algorithm, a parameter set, and a validation technique, or a combination of these, of the selected machine learning solution.

8. The device of claim 1, wherein the operations further comprise:
  receiving information defining a machine learning problem to be solved from a user;
  providing at least some of the information defining the machine learning problem to be solved to a plurality of other users;
  receiving from the other users information about a plurality of other machine learning solutions to the machine learning problem, wherein the plurality of other machine learning solutions are developed by the other users; and
  receiving from the user the selection input indicating a selected machine learning solution that satisfies requirements of the user.

9. The device of claim 8, wherein the operations further comprise:
  receiving, from the plurality of other users, information about revised machine learning solutions, wherein the revised machine learning solutions;
  developing one or more new hybrid machine learning solutions based on the information about revised machine learning solutions;
  scoring the one or more new hybrid machine learning solutions;
  ranking the one or more new hybrid machine learning solutions to produce an updated leaderboard ranking; and
  providing a human readable indication of the updated leaderboard ranking.

10. A non-transitory, computer readable storage medium, comprising executable instructions that, when executed by a processing system including a processor, facilitate performance of operations, the operations comprising:
  providing information about a machine learning problem to be solved, the providing comprising presenting the information about the machine learning problem to be solved;
  receiving, from a plurality of users, proposed solutions to the machine learning problem to be solved;
  sorting the proposed solutions according to a logarithmic loss determination for each respective proposed solution of the proposed solutions according to respective scores;
  selecting one or more first components of a first respective proposed solution and one or more second components of a second respective proposed solution and combining the one or more first components with the one or more second components to form a plurality of hybrid solutions;
  sorting the plurality of hybrid solutions with the proposed solutions forming a ranking of the plurality of hybrid solutions with the proposed solutions according to respective scores;
  providing information about ranking of the plurality of hybrid solutions with the proposed solutions; and
  receiving a user selection of a selected machine learning solution of the plurality of hybrid solutions and the proposed solutions, wherein the user selection corresponds to a selected machine learning solution that satisfies requirements of the user as selected by the user.

11. The non-transitory, computer readable storage medium of claim 10, wherein the forming a ranking of the plurality of hybrid solutions with the proposed solutions according to respective scores comprises:
  sorting the plurality of hybrid solutions with the proposed solutions according to a logarithmic loss determination for each respective hybrid solution and for each respective proposed solution of the proposed solutions.

12. The non-transitory, computer readable storage medium of claim 10, wherein the operations further comprise:
  receiving information about a business problem, an initial dataset associated with the business problem, and a scoring method for the machine learning problem to be solved.

13. The non-transitory, computer readable storage medium of claim 10, wherein the operations further comprise:
  receiving, from the plurality of users, machine learning solutions, wherein the machine learning solutions are designed by the plurality of users to solve the machine learning problem.

14. The non-transitory, computer readable storage medium of claim 13, wherein the receiving the machine learning solutions comprises:
  receiving, for each machine learning solution of the machine learning solutions, a plurality of machine learning model components, wherein the receiving the plurality of machine learning model components comprises receiving one or more of a machine learning model, a dataset and a data pipeline output.

15. The non-transitory, computer readable storage medium of claim 14, wherein the operations further comprise:
  combining one or more of a first machine learning model, a first dataset and a first data pipeline output of a first proposed solution with one or more of a second machine learning model, a second dataset and a second data pipeline output of a second proposed solution to form a hybrid solution of the plurality of hybrid solutions.

16. The non-transitory, computer readable storage medium of claim 14, wherein the operations further comprise:

providing training data to each machine learning solution to train the machine learning solution; and providing test data to the machine learning model to characterize performance of the machine learning model.

17. A method, comprising:

receiving information defining a machine learning problem to be solved;

receiving, by a processing system including a processor, a plurality of proposed machine learning solutions to the machine learning problem to be solved, wherein the receiving comprises receiving, by the processing system, for each respective proposed machine learning solution of the plurality of proposed machine learning solutions, one or more of a machine learning model, a dataset and a data pipeline output;

combining, by the processing system, at least one of a first component from a first proposed machine learning solution with at least one of a second component from a second proposed machine learning solution, forming hybrid solutions, wherein the first component comprises one or more of the machine learning model, the dataset and the data pipeline output of the first proposed machine learning solution, and wherein the second component comprises one or more of the machine learning model, the dataset and the data pipeline output of the second proposed machine learning solution; and ranking, by the processing system, the hybrid solutions according to a scoring.

18. The method of claim 17, further comprising:

determining, by the processing system, a quality score for the plurality of proposed machine learning solutions;

ranking, by the processing system, the plurality of proposed machine learning solutions with the hybrid solutions;

providing, by the processing system, information about the ranking to a user associated with the machine learning problem to be solved, wherein the providing comprises, generating, by the processing system, a leaderboard showing the ranking and making the leaderboard available at a web interface; and receiving from the user, by the processing system, at the web interface, a user selection of a selected machine learning solution of the plurality of the proposed machine learning solutions and the hybrid solutions.

19. The method of claim 18, further comprising:

receiving, by the processing system, from the user, information about the machine learning problem to be solved, wherein the receiving comprises receiving, at the web interface by the processing system, information defining the machine learning problem to be solved, an initial dataset and a scoring method; and providing, by the processing system, to other users at the web interface, the information about the machine learning problem to be solved.

20. The method of claim 18, further comprising:

providing, by the processing system, to a plurality of users, information about the machine learning problem to be solved;

receiving, by the processing system, at the web interface, the plurality of proposed machine learning solutions to the machine learning problem to be solved;

prompting, by the processing system, the plurality of users to provide a component breakdown of each respective proposed machine learning solution; and receiving, by the processing system, the component breakdown of each respective proposed machine learning solution.

* * * * *